(12) United States Patent
Sanchez Ribes et al.

(10) Patent No.: US 12,434,433 B2
(45) Date of Patent: Oct. 7, 2025

(54) MODIFY PROPERTY OF 3D PARTS TO CAUSE DIFFERENT NOZZLE USAGES

(71) Applicant: Peridot Print LLC, Palo Alto, CA (US)

(72) Inventors: Salvador Sanchez Ribes, Sant Cugat del Valles (ES); Jeremy Harlan Donaldson, Corvallis, OR (US); Macia Sole Pons, Sant Cugat del Valles (ES)

(73) Assignee: Peridot Print LLC, Palo Alo (CA)

( * ) Notice: Subject to any disclaimer, the term of this patent is extended or adjusted under 35 U.S.C. 154(b) by 418 days.

(21) Appl. No.: 17/907,306

(22) PCT Filed: Apr. 22, 2020

(86) PCT No.: PCT/US2020/029291
§ 371 (c)(1),
(2) Date: Sep. 26, 2022

(87) PCT Pub. No.: WO2021/216059
PCT Pub. Date: Oct. 28, 2021

(65) Prior Publication Data
US 2023/0116181 A1   Apr. 13, 2023

(51) Int. Cl.
*B29C 64/176*  (2017.01)
*B29C 64/165*  (2017.01)
(Continued)

(52) U.S. Cl.
CPC .......... *B29C 64/176* (2017.08); *B29C 64/165* (2017.08); *B29C 64/209* (2017.08);
(Continued)

(58) Field of Classification Search
CPC ... B29C 64/176; B29C 64/209; B29C 64/393; B29C 64/165; B33Y 10/00; B33Y 30/00; B33Y 50/00; B29K 2077/00
(Continued)

(56) References Cited

U.S. PATENT DOCUMENTS 6,158,835 A    12/2000  Jackson et al.
6,565,190 B1    5/2003  Nobel et al.
(Continued)

FOREIGN PATENT DOCUMENTS

WO    2019/103750 A1    5/2019

OTHER PUBLICATIONS

Mhatre, P, S., "Process Planning for Concurrent Multi-nozzle 3D printing", Theses, Rochester Institute of Technology, Apr. 19, 2019, pp. 1-119.

Primary Examiner — Md Azad
(74) Attorney, Agent, or Firm — Michael Dryja

(57) ABSTRACT

According to examples, an apparatus may include a memory on which is stored instructions that when executed by a processor, cause the processor to access a digital file identifying a first plurality of parts to be fabricated in a first level of a build volume in a three-dimensional (3D) fabrication operation and a second plurality of parts to be fabricated in a second level of the build volume. The processor may also determine a first usage of a plurality of nozzles corresponding to fabrication of the first plurality of parts in the first level of the build volume and determine a modification to a property of the second plurality of parts to be fabricated in the second level of the build volume to have a second usage of the plurality of nozzles that differs from the first usage.

20 Claims, 6 Drawing Sheets

(51) Int. Cl.
  *B29C 64/209* (2017.01)
  *B29C 64/393* (2017.01)
  *B29K 77/00* (2006.01)
  *B33Y 10/00* (2015.01)
  *B33Y 30/00* (2015.01)
  *B33Y 50/02* (2015.01)

(52) U.S. Cl.
  CPC ............ *B29C 64/393* (2017.08); *B33Y 10/00* (2014.12); *B33Y 30/00* (2014.12); *B33Y 50/02* (2014.12); *B29K 2077/00* (2013.01)

(58) Field of Classification Search
  USPC .......................................................... 700/95
  See application file for complete search history.

(56) References Cited

U.S. PATENT DOCUMENTS

| | | | |
|---|---|---|---|
| 6,997,541 B2 | 2/2006 | Edamura et al. | |
| 7,758,137 B2 | 7/2010 | Keller et al. | |
| 8,388,079 B2 | 3/2013 | Nakano et al. | |
| 9,457,586 B2 | 10/2016 | Fujita et al. | |
| 10,953,579 B2* | 3/2021 | Pruitt | B29C 45/76 |
| 2017/0157828 A1* | 6/2017 | Mandel | B29C 48/21 |
| 2018/0264735 A1* | 9/2018 | Vilajosana | B29C 64/165 |
| 2018/0339458 A1* | 11/2018 | De Pena | B33Y 30/00 |
| 2019/0270253 A1* | 9/2019 | Levi | B33Y 40/00 |
| 2021/0078245 A1* | 3/2021 | Olieslagers | B33Y 30/00 |
| 2021/0283835 A1* | 9/2021 | Novick | B29C 64/165 |

\* cited by examiner

MODIFY PROPERTY OF 3D PARTS TO CAUSE DIFFERENT NOZZLE USAGES

BACKGROUND

In three-dimensional (3D) printing, an additive printing process may be used to make 3D solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat, a chemical binder, and/or an ultra-violet or a heat curable binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
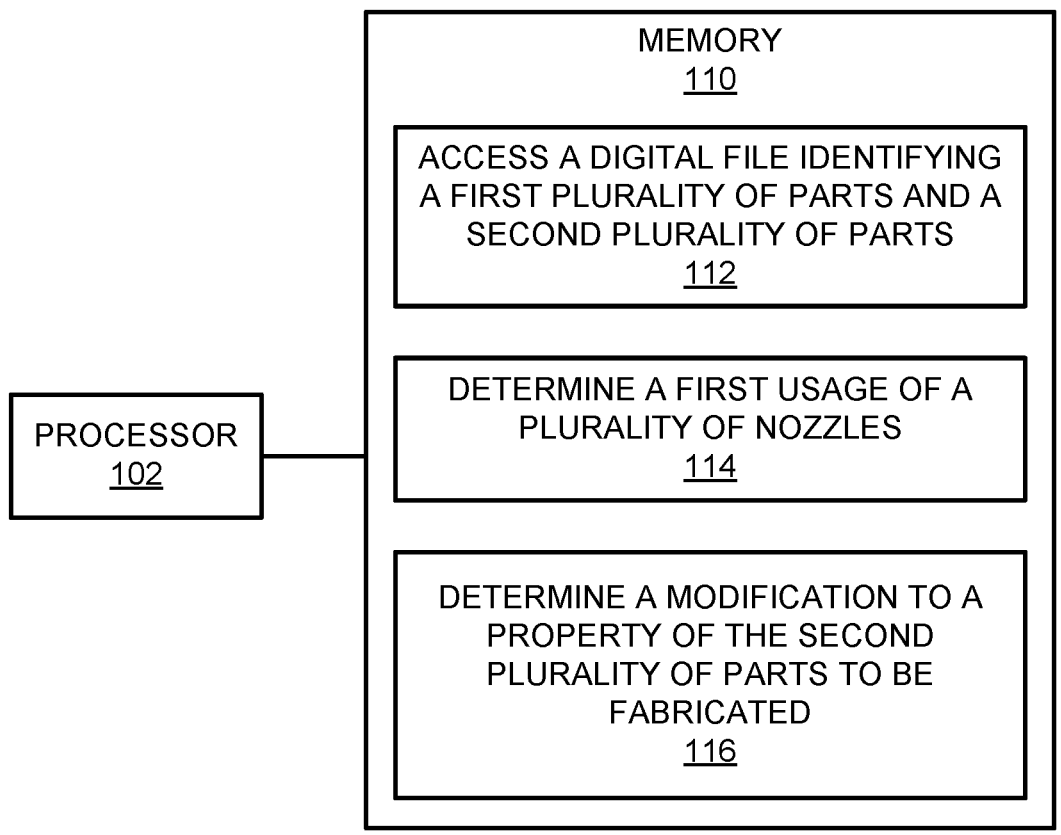
FIG. 1 shows a block diagram of an example apparatus that may determine a modification to a property of a second plurality of parts to be fabricated in a second level of a build volume to have a second usage of a plurality of nozzles that differs from a first usage of the plurality of nozzles.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Some types of 3D fabrication systems may include an array of printheads that extend across a dimension of a build volume. Each of the printheads may include arrays of nozzles such that the nozzles may selectively be actuated to deposit a print agent at selected locations across layers in the build volume as the printheads are scanned across the layers (or as the build volume is scanned with respect to the printheads). However, as the printheads may extend across a dimension of the build volume, relative movement perpendicular to the scan direction may not occur. As a result, during certain types fabrication operations, such as during batch printing operations in which the same part or parts may repeatedly be fabricated on multiple levels of the build volume, some of the nozzles may be used at a significantly higher rate than other ones of the nozzles. For instance, there may be areas in the levels at which no agent is deposited, such as between respective parts and other areas where agent is deposited at a significantly higher level. This may result in the nozzles that are used more often to have shorter lives and may make the printheads less reliable.

Disclosed herein are apparatuses, methods, and computer-readable mediums that may cause 3D parts to be fabricated across multiple levels of a build volume in manners that may result in the nozzles of a 3D fabrication system being used in a substantially uniform manner with respect to each other. For instance, the nozzles may be used to fabricate the 3D parts across the multiple levels such that the uniformity at which the nozzles are used may be maximized. In some regards, by making the usage of the nozzles more uniform as disclosed herein, the useful lives of the nozzles as well as the printheads in which the nozzles are provided may be maximized.

According to examples, a processor of an apparatus disclosed herein may determine a modification to a property, e.g., a position (e.g., a shift or translation in the x and/or y directions), an orientation (e.g., rotation), and/or the like, of a second plurality of parts to be fabricated in a second level of a build volume. Particularly, for instance, the processor may determine the modification to the property that may result in the maximum uniformity of the nozzle usage as disclosed herein. That is, the processor may determine the modification to be a modification that may result in the maximum uniformity of the usage of the nozzles in the fabrication of a first plurality of parts in a first level of the build volume and the fabrication of the second plurality of parts in a second level of the build volume. The first level of the build volume may include a first plurality of build material particle layers and the second level of the build volume may include a second plurality of build material particle layers.

Figure 2A:
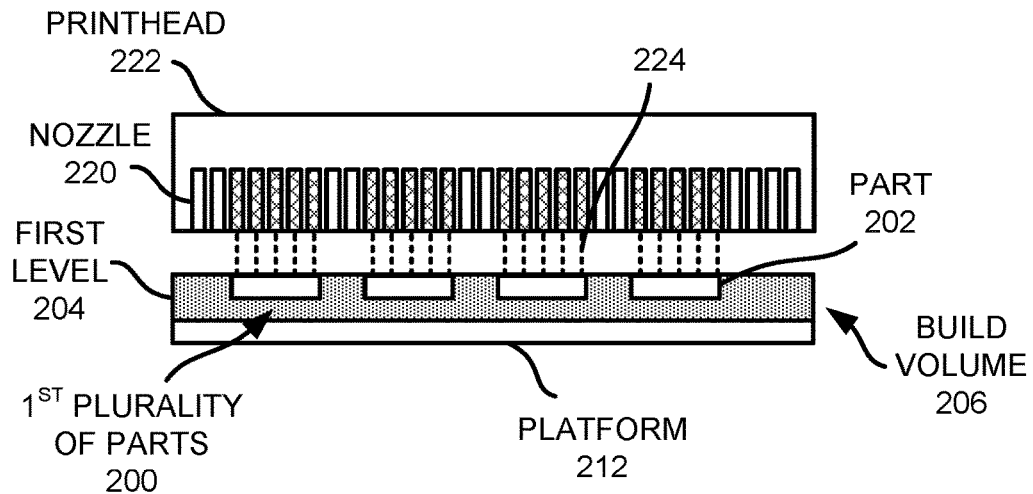
FIGS. 2A-2C, respectively, show cross-sectional side views of various example stages in the formation of a first plurality of parts and a second plurality of parts, in which a property of the second plurality of parts may have been modified by the example apparatus depicted in FIG. 1.
Figure 2B:
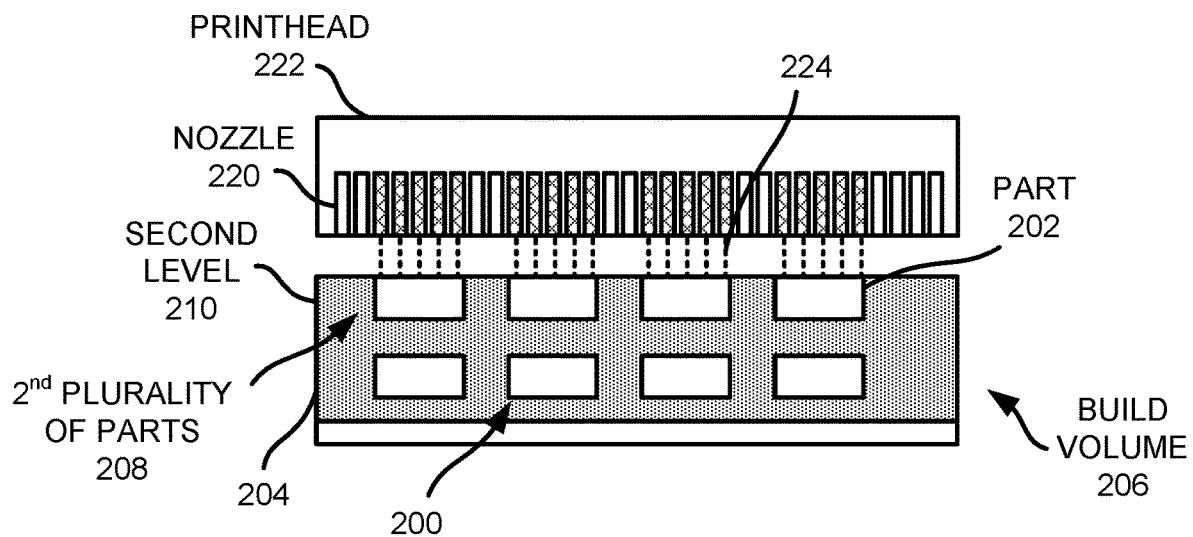
Figure 2C:
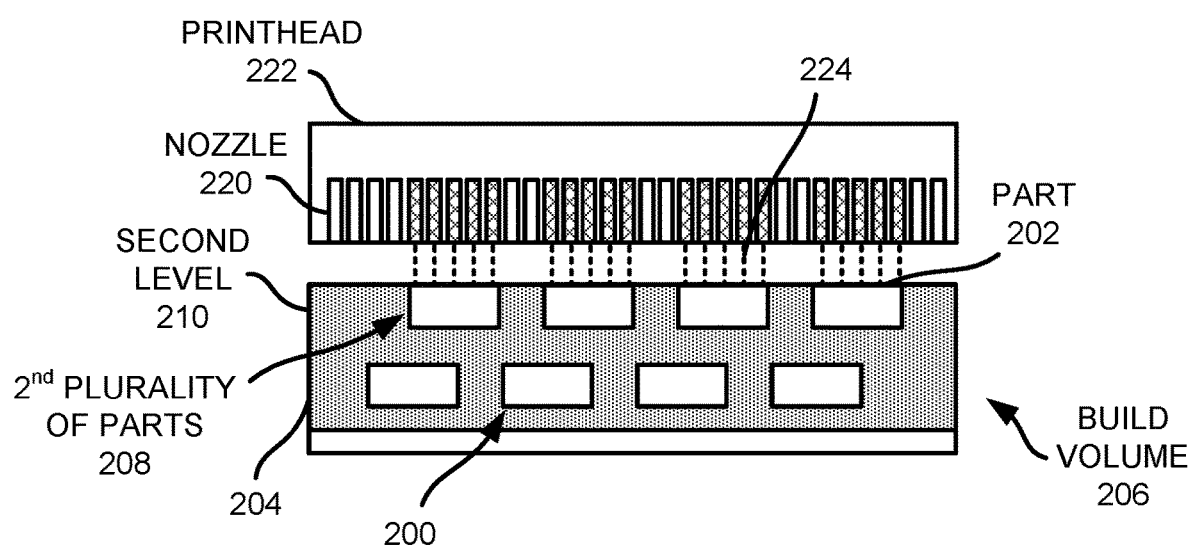

Reference is first made to FIGS. 1 and 2A-2C. FIG. 1 shows a block diagram of an example apparatus 100 that may determine a modification to a property of a second plurality of parts to be fabricated in a second level of a build volume to have a second usage of a plurality of nozzles that differs from a first usage of the plurality of nozzles. FIGS. 2A-2C, respectively, show cross-sectional side views of various example stages in the formation of a first plurality of parts and a second plurality of parts, in which a property of the second plurality of parts may have been modified by the example apparatus 100 depicted in FIG. 1. It should be understood that the example apparatus 100 depicted in FIG. 1 and/or the example various stages depicted in FIGS. 2A-2C may include additional features and that some of the features described herein may be removed and/or modified without departing from the scopes of the apparatus 100 and/or the various example stages.

The apparatus 100 may be a computing system such as a server, a laptop computer, a tablet computer, a desktop computer, or the like. As shown, the apparatus 100 may include a processor 102, which may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions (which may also be termed computer-readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and multiple memories 110. In addition, or alternatively, the processor 102 and the memory 110 may be integrated into a single component, e.g., an integrated circuit on which both the processor 102 and the memory 110 may be provided.

As shown in FIG. 1, the memory 110 may have stored thereon machine-readable instructions 112-116 that the processor 102 may execute. Although the instructions 112-116 are described herein as being stored on the memory 110 and may thus include a set of machine-readable instructions, the apparatus 100 may include hardware logic blocks that may perform functions similar to the instructions 112-116. For instance, the processor 102 may include hardware components that may execute the instructions 112-116. In other examples, the apparatus 100 may include a combination of instructions and hardware logic blocks to implement or execute functions corresponding to the instructions 112-116. In any of these examples, the processor 102 may implement the hardware logic blocks and/or execute the instructions 112-116. As discussed herein, the apparatus 100 may also include additional instructions and/or hardware logic blocks such that the processor 102 may execute operations in addition to or in place of those discussed above with respect to FIG. 1.

The processor 102 may execute the instructions 112 to access a digital file identifying a first plurality of parts 200 (individually labeled as parts 202) to be fabricated in a first level 204 of a build volume 206 in a three-dimensional (3D) fabrication operation and a second plurality of parts 208 to be fabricated in a second level 210 of the build volume 206. The processor 102 may access the digital file from a data store (not shown) or some other source, e.g., directly from a user, from an online source, etc. In addition, the processor 102 may process the digital file to determine how components of a 3D fabrication system are to be operated to fabricate the parts 202. For instance, the processor 102 may process the digital file in a printing pipeline, in which the output of the printing pipeline may be used to control the components to fabricate the parts 202 according to the information contained in the digital file. However, as discussed herein, the processor 102 may modify the digital file and/or may modify a property of the second plurality of parts 208 such that a plurality of nozzles 220 may be used more uniformly with respect to each other in the formation of the first plurality of parts 200 and the second plurality of parts 208.

The digital file may be a computer model, e.g., a computer aided design (CAD) file, or other digital representation, that may define properties of the first and second plurality of parts 200, 208 to be fabricated within the build volume 206 during a 3D fabrication operation. The digital file may identify the first plurality of parts 200 to be fabricated in the first level 204 of the build volume 206 in a particular pattern and may identify the second plurality of parts 208 to be fabricated in the second level 210 of the build volume 206 in the particular pattern. For instance, the digital file may define the positions at which each of the parts 202 is to be fabricated within the build volume 206. The digital file may also define the shapes, colors, textures, mechanical properties, and/or the like, that the parts 202 are to have when fabricated. By way of example, the digital file may define the parts 202 to be fabricated as part of a batch fabrication job in which the same part 202 is or multiple parts are fabricated a number of times across multiple levels 204, 210. In other examples, however, some of the parts 202 may have different properties from other ones of the parts 202. Thus, for instance, some of the parts 202 may have a different shape, color, and/or the like, from other ones of the parts 202.

As shown in FIGS. 2A and 2B, the nozzles 220 may be housed in a printhead 222 and may deposit a liquid, which is represented as dashed lines 224, onto layers of build material particles provided on a platform 212. The build volume 206 may be a volume or a space above the platform 212. Various manners in which the printhead 222 and the nozzles 220 may be operated are described with respect to FIG. 3, which depicts an example of a suitable 3D fabrication system 300 that may be employed to fabricate the parts 202 depicted in FIGS. 2A-2C. It should be understood that the example 3D fabrication system 300 depicted in FIG. 3 may include additional features and that some of the features described herein may be removed and/or modified without departing from the scope of the 3D fabrication system 300.

Figure 3:
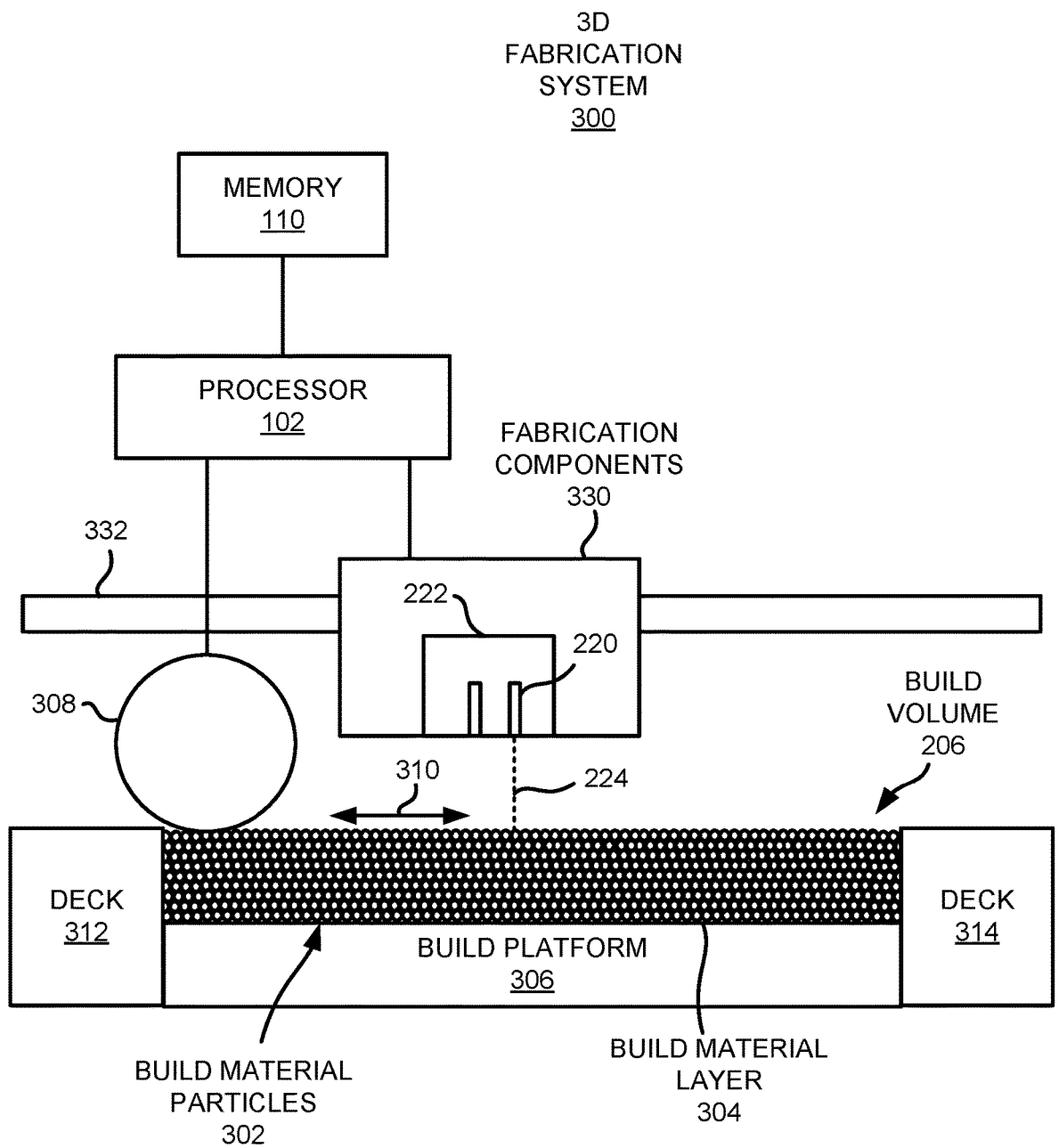
FIG. 3 depicts an example of a suitable 3D fabrication system that may be employed to fabricate the parts depicted in FIGS. 2A-2C.

As shown in FIG. 3, build material particles 302 may be formed into a build material layer 304 (or multiple build material layers 304) on a build platform 306, which is equivalently depicted in FIGS. 2A and 2B as the platform 212. The build material particles 302 may include any suitable material for use in forming 3D objects, for instance, a polymer, a plastic, a ceramic, a nylon, a metal, combinations thereof, or the like, and may be in the form of a powder or a powder-like material. According to one example, a suitable build material may be PA12 build material commercially known as V1R10A "HP PA12" available from HP Inc. In another example, a suitable build material may be PA11 build material commercially available from HP Inc.

As shown, the 3D fabrication system 300 may include a recoater 308, which may spread, spray, or otherwise form the build material particles 302 into a build material layer 304 as the recoater 308 is moved, e.g., scanned, across the build platform 306 as indicated by the arrow 310. According to examples, the build platform 306 may provide a build area (or equivalently a build volume 206) for the build material particles 302 to be spread into successive layers 304 of build material particles 302. The build platform 306 may be movable in a direction away from the recoater 308 during formation of successive build material layers 304.

According to examples, the 3D fabrication system 300 may include a deck 312 or multiple decks 312, 314 from which build material particles 302 may be supplied for formation into the build material layers 304. For instance, the deck 312 may supply an amount of build material particles 302 on top of the deck 312 that the recoater 308 may push over the build platform 306 as the recoater 308 is moved across the build platform 306 as denoted by the arrow 310 to form a build material layer 304 on the build platform 306 or on a previously formed build material layer 304.

As shown, the processor 102 may control operations of the recoater 308. In other examples, however, the 3D fabrication system 300 may include a separate controller (not shown) that may control operations of the recoater 308 in which the processor 102 may communicate with the controller. The processor 102 and/or another controller (not shown) may control other components of the 3D fabrication system 300. For instance, the 3D fabrication system 300 may include fabrication components 330 and the memory 110 may have instructions that the processor 102 or the controller may execute to control the fabrication components 330. Particularly, the processor 102 or controller may control the fabrication components 330 to cause the build material particles 302 at selected locations of the build material layer 304 to be bound and/or fused together to form the parts 202 in the build material layers 304.

The fabrication components 330 may include the printhead 222 and the nozzles 220 depicted in FIGS. 2A and 2B. The processor 102 and/or the controller may control the nozzles 220 to selectively deliver a liquid 224 onto the build material layer 304. For instance, the processor 102 may control some or all of the nozzles 220 to deliver the liquid 224, which may be a fusing agent, a wetting agent, a binding agent, and/or the like, onto the selected locations of the build material layer 304 that are to be bound/fused together to form the parts 202. By way of particular example, the nozzles 220 may each include a droplet ejector, e.g., a resistor, a piezoelectric actuator, and/or the like, that may eject droplets of the liquid 224 through the nozzles 220.

According to examples, the liquid 224 may be a fusing and/or a binding agent to selectively bind and/or solidify the build material particles 302 on which the liquid 224 has been deposited. In particular examples, the liquid 224 may be a chemical binder, a thermally curable binder, and/or the like. In other particular examples, the liquid 224 may be a fusing agent that may increase the absorption of energy to selectively fuse the build material particles 302 upon which the liquid 224 has been deposited.

According to one example, a suitable fusing agent may be an ink-type formulation including carbon black, such as, for example, the fusing agent formulation commercially known as V1Q60A "HP fusing agent" available from HP Inc. In one example, such a fusing agent may additionally include an infra-red light absorber. In one example such fusing agent may additionally include a near infra-red light absorber. In one example, such a fusing agent may additionally include a visible light absorber. In one example, such a fusing agent may additionally include a UV light absorber. Examples of fusing agents including visible light enhancers are dye based colored ink and pigment based colored ink, such as inks commercially known as CE039A and CE042A available from HP Inc.

Some of the nozzles 220 may also or additionally deposit another type of liquid 224. The other type of liquid 224 may be a detailing agent, a coalescence modifier agent, or the like, which may inhibit or prevent fusing and/or binding of build material particles 302 upon which the other type of liquid 224 has been deposited, for example by modifying the effect of a fusing and/or binding agent. According to one example, a suitable detailing agent may be a formulation commercially known as V1Q61A "HP detailing agent" available from HP Inc.

By way of example, the processor 102 or the controller may control the nozzles 220 to selectively deposit the other type of liquid 224 onto areas of the build material layer 304 that are not to be fused. For instance, the processor 102 may control some of the nozzles 220 to deposit the other type of liquid 224 onto areas of the layer 304 adjacent the areas that are to be fused/binded together to form the parts 202. In addition, or alternatively, the processor 102 may control some of the nozzles 220 to deposit the other type of liquid 224 onto the build material particles 302 positioned in areas of the layer 304 that are to remain unfused.

The fabrication components 330 may also include an energy source that may apply energy, e.g., warming energy, onto the build material layer 304, for instance, to warm the build material particles 302 in the build material layer 304 to an intended temperature. The energy source may output energy, e.g., in the form of light and/or heat and may be supported on a carriage, which may be movable across the build platform 306. As such, for instance, the energy source may output energy onto the build material layer 304 as the carriage is moved across the build platform 306 to cause the build material particles 302 upon which the fusing agent has been deposited to melt and subsequently fuse together.

According to examples, the processor 102 or the controller may control movement of the fabrication components 330. That is, for instance, the controller 320 may control actuators, motors, or the like, that may control movement of the fabrication components 330 across the build platform 306. As shown, the 3D fabrication system 300 may include a mechanism 332 along which the fabrication components 330, e.g., a carriage on which the fabrication components 330 may be supported, may move across the build platform 306. The mechanism 332 may be any suitable mechanism by which and/or which may cause the carriage to be moved. For instance, the mechanism 332 may include an actuator, a belt, and/or the like that may cause the carriage to be moved.

According to examples, and as shown in FIGS. 2A and 2B, the nozzles 220 and the printhead 222 may extend across a width of the build volume 206. As such, for instance, as the fabrication components 330 are moved across the build material layers 304, the processor 102 and/or the controller may selectively activate (or equivalently, fire) the nozzles 220 to selectively apply the liquid 224 on the build material layers 304 at intended locations on the layers 304 to form the parts 202. In addition, the fabrication components 330 may be fixed from movement in a direction perpendicular to the arrows 310. As such, for instance, a small number or a particular one of the nozzles 220 may deposit liquid 224 at a particular lateral position along the directions denoted by the arrows 310. Thus, for instance, depending on the locations at which the parts 202 are formed in the build material layers 304 of the build volume 206, some of the nozzles 220 may be activated a substantially larger number of times during formation of the parts 202 than other ones of the nozzles 220.

With reference back to FIG. 1, the processor 102 may execute the instructions 114 to determine a first usage of the plurality of nozzles 220 corresponding to fabrication of the first plurality of parts 200 in the first level 204 of the build volume 206. The first level 204 may be composed of the plurality of the build material layers 304 within which the first plurality of parts 200 are to be or are fabricated.

According to examples, the processor 102 may model usage of the plurality of nozzles 220 in fabricating the first plurality of parts 200 in the first level 204 to determine the first usage of the plurality of nozzles 220 corresponding to fabrication of the first plurality of parts 200. That is, prior to the nozzles 220 being used to selectively deposit the liquid 224, e.g., a binding agent, a fusing agent, a wetting agent, a coalescing agent, a coalescence modifier agent, and/or the like, onto layers 304 of the build material particles 302 in the first level 204 to form the first plurality of parts 200, the processor 102 may model the first usage of the plurality of nozzles 220. In other words, for instance, the processor 102 may determine, predict, map, and/or the like, the number of times at which each of the nozzles 220 is to be activated, e.g., fired, as the printhead 222 is scanned across respective layers 304 in the first level 204 of the build material particles 302 to form the first plurality of parts 200. In addition or alternatively to determining the number of times that each of the nozzles 220 is to be activated, the processor 102 may determine another characteristic, such as volumes of liquid 224 to be delivered by each of the nozzles 220, or the like.

In other examples, the processor 102 may track usage of the plurality of nozzles 220 during fabrication of the first plurality of parts 200 in the first level 204 to determine the first usage of the plurality of nozzles 220 corresponding to fabrication of the plurality of parts 200. That is, for instance, the processor 102 may track the number of times each of the nozzles 220 were activated, e.g., fired, during the fabrication of the first plurality of parts 200. In addition or alternatively to tracking the number of times that each of the nozzles 220 were activated, the processor 102 may determine another characteristic, such as volumes of liquid 224 delivered by each of the nozzles 220, or the like.

In any regard, and as shown in FIGS. 2A and 2B, the same set of nozzles 220, e.g., the nozzles 220 shown with hash marks, may be used primarily or exclusively to deposit the liquid 224 to fabricate the first plurality of parts 200 and the second plurality of parts 208. In addition, the other nozzles 220, e.g., the nozzles 220 shown without hash marks, may not be used or may be used sparingly in the fabrication of the first plurality of parts 200 and the second plurality of parts 208. That is, some of the nozzles 220 may be used a significantly larger number of times as compared with some of the other nozzles 220. These usage differences may be amplified when there are additional parts 202 fabricated in additional levels (not shown), for instance, when fabricating batch jobs in which the parts 202 may all be the same and repeated in each of the levels.

The differences in the usages of the nozzles 220 may result in the nozzles 220 firing the most using up their expected lives earlier, which may also result in a shorter overall life of the printhead 222. In addition, the nozzles 220 having the higher usages as well as the nozzles 220 adjacent to those nozzles 220 may pick up more build material particles 302 as a result of the perturbations of the build material particles 302, which may create some powder clouds that may land on the nozzles 220 and those adjacent nozzles 220. This may also result in an increased frequency of clogged nozzles 220, which may produce a shorter life than expected of the printhead 222. As discussed herein, the processor 102 may determine a modification to a property of the second plurality of parts 208 that may result in the usage of the plurality of nozzles 220 being more uniform with respect to each other in fabricating the first plurality of parts 200 and the second plurality of parts 208.

The processor 102 may execute the instructions 116 to determine a modification to a property of the second plurality of parts 208 to be fabricated in the second level 210 of the build volume 206 to have a second usage of the plurality of nozzles 220 that differs from the first usage. According to examples, the property of the second plurality of parts 208 may include positions of some or all of the second plurality of parts 208 within the second level 210, orientations of some or all of the second plurality of parts 208 within the second level 210, and/or the like. For instance, the processor 102 may determine a shift in the positions of some or all of the second plurality of parts 208 as shown in FIG. 2C. That is, FIG. 2C shows the second plurality of parts 208 being shifted with respect to FIG. 2B. As a result, a first set of the nozzles 220 may be primarily used to fabricate the first plurality of parts 200 and a second set of the nozzles 220 may be primarily used to fabricate the second plurality of parts 208. In some instances, the first set of nozzles 220 may be entirely different from the second set of nozzles 220, whereas in other instances, some of the nozzles 220 may be in both sets of nozzles 220.

According to examples, the processor 102 may determine the manipulation to the property of the second plurality of parts 208 that is to result in the plurality of nozzles 220 being used more uniformly with respect to each other to fabricate the first plurality of parts 200 and the second plurality of parts 208 as compared with use of the plurality of nozzles 220 to fabricate the first plurality of parts 200 and the second plurality of parts 208 without the modification to the property of the second plurality of parts 208. Thus, for instance, the processor 102 may execute a modeling program or other type of program that may determine nozzle 220 usages resulting from various candidate modifications to the property of the second plurality of parts 208 and the processor 102 may select the candidate modification that is predicted to result in a highest level of uniformity in the nozzle 220 usages among the candidate modifications in the fabrication of the first plurality of parts 200 and the second plurality of parts 208. In some examples, the processor 102 may determine the modification to be a modification that may not result in a reduction in the number of the second plurality of parts 208 to be fabricated in the second level 210.

The processor 102 may also cause the second plurality of parts 208 to be fabricated according to the determined modification to the property of the second plurality of parts 208 in the second level 210. In some examples, the processor 102 may alter the digital file to include the determined modification. In other examples, the processor 102 may cause the determined modification to be applied as instructions are submitted to the fabrication components 330, e.g., the printhead 222 and the nozzles 220. That is, the processor 102 or a controller of the 3D fabrication system 300 may control the nozzles 220 to deposit the liquid 224 to form the parts 202 in the second level 210 according to the determined modification.

As shown in FIGS. 2B and 2C, the second level 210 may be formed of build material layers 304 that may be above the build material layers 304 forming the first level 204. Thus, in some examples, the second plurality of parts 208 may be fabricated after the first plurality of parts 200 are fabricated in the first level 204. In other examples, however, the second level 210 may be below the first level 204 such that the second plurality of parts 208 may be fabricated prior to the fabrication of the first plurality of parts 200. Thus, for instance, instead of modifying the property of the second plurality of parts 208 after the first plurality of parts 200 are fabricated, the property of the second plurality of parts 208 may be modified and the second plurality of parts 208 may be fabricated in the second level 210 prior to the first plurality of parts 200 being fabricated in the first level 204.

Figure 4:
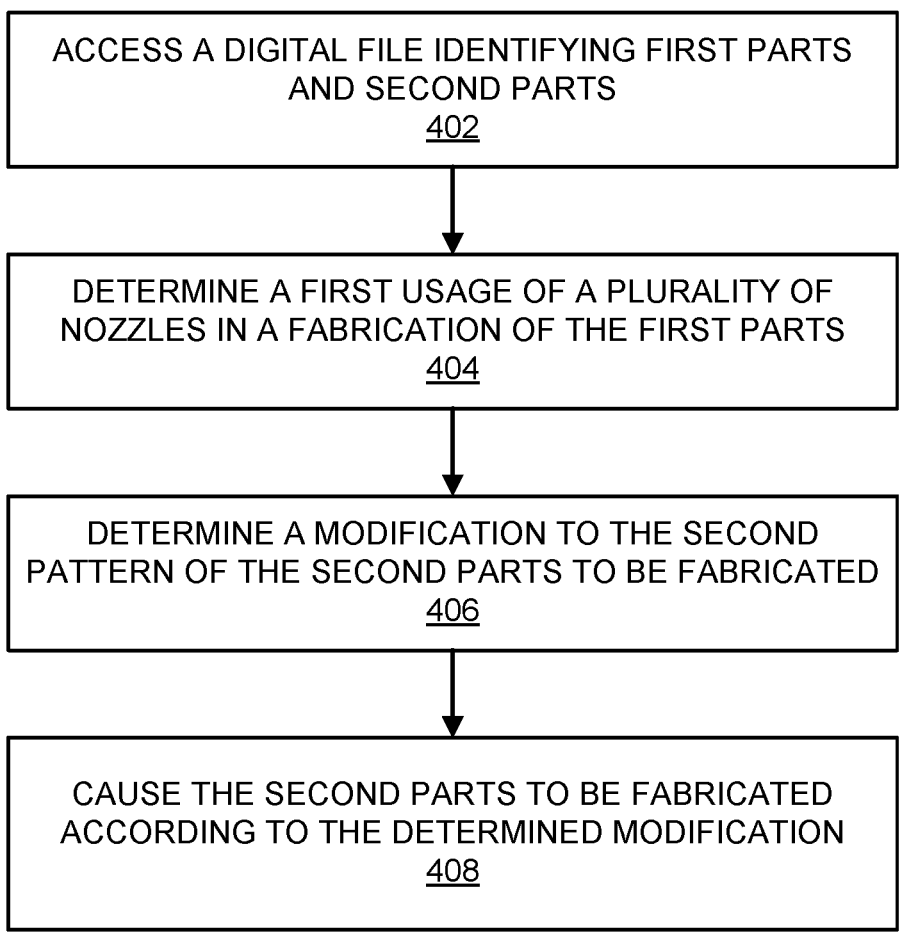
FIG. 4 shows a flow diagram of an example method for determining a modification to a second pattern of a second plurality of parts to be fabricated in a second level of a build volume, in which the modification to the second pattern is to cause a plurality of nozzles to have a second usage that differs from a first usage of the plurality of nozzles in the fabrication of a first plurality of parts.

Turning now to FIG. 4, there is shown a flow diagram of an example method 400 for determining a modification to a second pattern of a second plurality of parts 208 to be fabricated in a second level 210 of a build volume 206, in which the modification to the second pattern is to cause a plurality of nozzles 220 to have a second usage that differs from a first usage of the plurality of nozzles 220 in the fabrication of a first plurality of parts 200. It should be understood that the method 400 depicted in FIG. 4 may include additional operations and that some of the operations described therein may be removed and/or modified without departing from the scope of the method 400. The description of the method 400 is also made with reference to the features depicted in FIGS. 1-3 for purposes of illustration. Particularly, the processor 102 may execute some or all of the operations included in the method 400.

At block 402, the processor 102 may access a digital file identifying a first plurality of parts 200 to be fabricated in a first pattern in a first level 204 of a build volume 206 and a second plurality of parts 208 to be fabricated in a second pattern in a second level 210 of the build volume 206. The first pattern may include an arrangement of the parts 202 to be fabricated in the first level 204. For instance, the parts 202 may be arranged in a first pattern that may result in a maximum number of the parts 202 to be formed while complying with certain distance requirements between the parts 202. The second pattern may be the same as the first pattern such that, for instance, the second plurality of parts 208 may be aligned with the first plurality of parts 200 as may occur during batch fabrication jobs.

At block 404, the processor 102 may determine a first usage of a plurality of nozzles 220 in a fabrication of the first plurality of parts 200 in the first level 204 of the build volume 206. The processor 102 may determine the first usage through modeling and/or through tracking of the nozzle 220 usage as discussed herein.

At block 406, the processor 102 may determine a modification to the second pattern of the second plurality of parts 208 to be fabricated in the second level 210 of the build volume 206. The modification to the second pattern is to cause the plurality of nozzles 220 to have a second usage that differs from the first usage. The processor 102 may determine the modification such that the second usage of the plurality of nozzles 220 may include a usage of the plurality of nozzles 220 that is to result in the plurality of nozzles 220 being used more uniformly with respect to each other to fabricate the first plurality of parts 200 and the second plurality of parts 208 as compared with use of the plurality of nozzles 220 to fabricate the first plurality of parts 200 and the second plurality of parts 208 without the modification to the second pattern.

At block 408, the processor 102 may cause the second plurality of parts 208 to be fabricated in the second level 210 of the build volume 206 according to the determined modification. The processor 102 may cause the second plurality of parts 208 to be fabricated in any of the manners discussed above with respect to FIG. 3.

Some or all of the operations set forth in the method 400 may be contained as utilities, programs, or subprograms, in any desired computer accessible medium. In addition, the method 400 may be embodied by computer programs, which may exist in a variety of forms. For example, the method 400 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
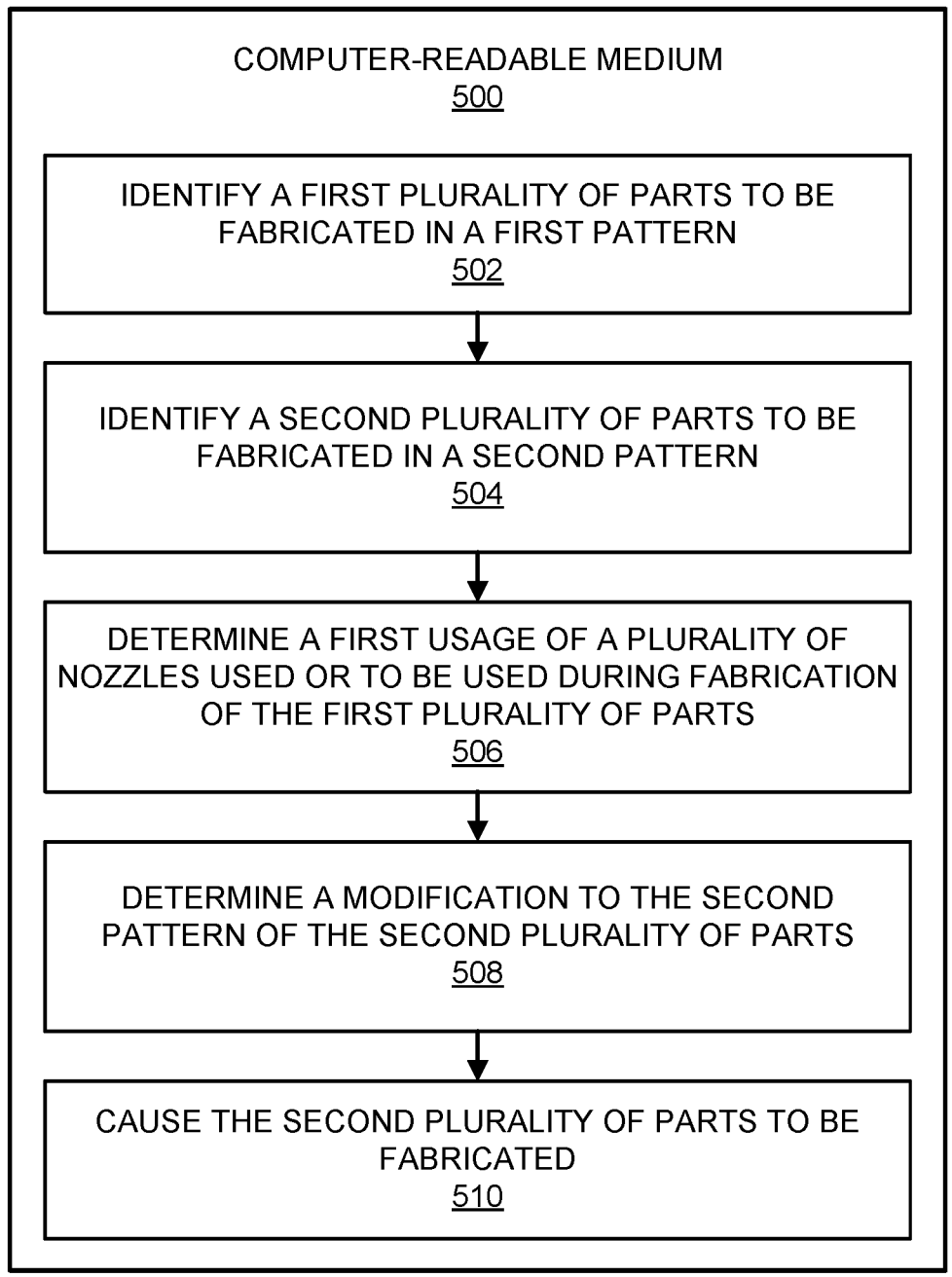
FIG. 5 shows a block diagram of an example computer-readable medium that may have stored thereon computer-readable instructions for causing a second plurality of parts to be fabricated with a modification to an identified second pattern at which the second plurality of parts are to be fabricated.

Turning now to FIG. 5, there is shown a block diagram of an example computer-readable medium 500 that may have stored thereon computer-readable instructions for causing a second plurality of parts 208 to be fabricated with a modification to an identified second pattern at which the second plurality of parts 208 are to be fabricated. It should be understood that the example computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon machine-readable instructions 502-510 that a processor, such as the processor 102 depicted in FIG. 1, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to identify a first plurality of parts 200 to be fabricated in a first pattern in a first level 204 of a build volume206. The processor may fetch, decode, and execute the instructions 504 to identify a second plurality of parts 208 to be fabricated in a second pattern in a second level 210 of the build volume 206. The processor may fetch, decode, and execute the instructions 506 to determine a first usage of a plurality of nozzles 220 used or to be used during fabrication of the first plurality of parts 200 in the first level 204 of the build volume 206.

The processor may fetch, decode, and execute the instructions 508 to determine a modification to the second pattern of the second plurality of parts 208 to be fabricated in the second level 210 of the build volume 206, in which the modification to the second pattern is to cause the plurality of nozzles 220 to have a second usage that results in a more uniform usage of the plurality of nozzles 220. For instance, the processor may determine the modification to the second pattern that is to result in the usage of the plurality of nozzles 220 to be more uniform with respect to each other as compared with use of the plurality of nozzles 220 to fabricate the first plurality of parts 200 and the second plurality of parts 208 without the modification to the second pattern. The processor may fetch, decode, and execute the instructions 510 to cause the second plurality of parts 208 to be fabricated in the second level 210 of the build volume 206 according to the determined modification.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory storing instructions executable by the processor to:
access a digital file identifying a first plurality of parts and a second plurality of parts to be additively fabricated in a build volume by, on a layer-by-layer basis, depositing a layer of build material powder, selectively ejecting print agent on the deposited layer by a plurality of nozzles, and fusing the build material powder in accordance with where the print agent was selectively ejected by the plurality of nozzles;
determine a first usage of the plurality of nozzles to selectively eject the print agent to additively fabricate the first plurality of parts in a first level of the build volume; and
determine a modification of either or both of an orientation and a position of the second plurality of parts to be fabricated in a second level of the build volume above the first level, such that a second usage of the plurality of nozzles to selectively eject the print agent to additively fabricate the second plurality of parts in the second level differs from the first usage in a way that increases uniformity in nozzle usage in print agent ejection.

2. The apparatus of claim 1, wherein to determine the modification of either or both of the orientation and the position of the second plurality of parts, the instructions are executable by the processor to determine the second usage of the plurality of nozzles that results in the plurality of nozzles being used more uniformly with respect to each other to fabricate the first plurality of parts and the second plurality of parts as compared with usage of the plurality of nozzles to fabricate the first plurality of parts and the second plurality of parts without the modification of either or both of the orientation and the position of the second plurality of parts.

3. The apparatus of claim 1, wherein the modification of either or both of the orientation and the position of the second plurality of parts comprises either or both of modification of some or all of the positions of the second plurality of parts within the second level and modification of the orientations of some or all of the second plurality of parts within the second level.

4. The apparatus of claim 1, wherein the digital file identifies the first plurality of parts to be fabricated in the first level of the build volume in a first particular pattern and identifies the second plurality of parts to be fabricated in the second level of the build volume in a second particular pattern identical to the first particular pattern.

5. The apparatus of claim 1, wherein the instructions cause are executable by the processor to model usage of the plurality of nozzles in fabricating the first plurality of parts in the first level to determine the first usage of the plurality of nozzles.

6. The apparatus of claim 1, wherein the instructions cause are executable by the processor to track usage of the plurality of nozzles during fabrication of the first plurality of parts in the first level to determine the first usage of the plurality of nozzles.

7. The apparatus of claim 1, wherein the instructions cause are executable by the processor to:
cause the first plurality of parts to be fabricated in the first level; and
cause the second plurality of parts to be fabricated according to the determined modification of either or both of the orientation and the position of the second plurality of parts in the second level.

8. A non-transitory machine-readable medium storing instructions executable by a processor to:
access a digital file identifying a first plurality of parts and a second plurality of parts to be additively fabricated in a build volume by, on a layer-by-layer basis, depositing a layer of build material powder, selectively ejecting print agent by a plurality of nozzles on the deposited layer, and fusing the build material powder in accordance with where the print agent was selectively ejected by the plurality of nozzles;
determine a first usage of the plurality of nozzles to selectively eject the print agent to additively fabricate the first plurality of parts in a first level of the build volume; and
determine a modification of either or both of an orientation and a position of the second plurality of parts to be fabricated in a second level of the build volume above the first level, such that a second usage of the plurality of nozzles to selectively eject the print agent to additively fabricate the second plurality of parts in the second level differs from the first usage in a way that increases uniformity in nozzle usage in print agent ejection.

9. The non-transitory machine-readable medium of claim 8, wherein to determine the modification of either or both of the orientation and the position of the second plurality of parts, the instructions are executable by the processor to determine the second usage of the plurality of nozzles that results in the plurality of nozzles being used more uniformly with respect to each other to fabricate the first plurality of parts and the second plurality of parts as compared with usage of the plurality of nozzles to fabricate the first plurality of parts and the second plurality of parts without the modification of either or both of the orientation and the position of the second plurality of parts.

10. The non-transitory machine-readable medium of claim 8, wherein the modification of either or both of the orientation and the position of the second plurality of parts comprises either or both of modification of some or all of the positions of the second plurality of parts within the second level and modification of the orientations of some or all of the second plurality of parts within the second level.

11. The non-transitory machine-readable medium of claim 8, wherein the digital file identifies the first plurality of parts to be fabricated in the first level of the build volume in a first particular pattern and identifies the second plurality of parts to be fabricated in the second level of the build volume in a second particular pattern identical to the first particular pattern.

12. The non-transitory machine-readable medium of claim 8, wherein the instructions are executable by the processor to model usage of the plurality of nozzles in fabricating the first plurality of parts in the first level to determine the first usage of the plurality of nozzles.

13. The non-transitory machine-readable medium of claim 8, wherein the instructions are executable by the processor to track usage of the plurality of nozzles during fabrication of the first plurality of parts in the first level to determine the first usage of the plurality of nozzles.

14. The non-transitory machine-readable medium of claim 8, wherein the instructions are executable by the processor to:
- cause the first plurality of parts to be fabricated in the first level; and
- cause the second plurality of parts to be fabricated according to the determined modification of either or both of the orientation and the position of the second plurality of parts in the second level.

15. A method performed by a processor and comprising:
- accessing a digital file identifying a first plurality of parts and a second plurality of parts to be additively fabricated in a build volume by, on a layer-by-layer basis, depositing a layer of build material powder, selectively ejecting print agent by a plurality of nozzles on the deposited layer, and fusing the build material powder in accordance with where the print agent was selectively ejected by the plurality of nozzles;
- determining a first usage of the plurality of nozzles to selectively eject the print agent to additively fabricate the first plurality of parts in a first level of the build volume;
- determining a modification of either or both of an orientation and a position of the second plurality of parts to be fabricated in a second level of the build volume above the first level, such that a second usage of the plurality of nozzles to selectively eject the print agent to additively fabricate the second plurality of parts in the second level differs from the first usage in a way that increases uniformity in nozzle usage in print agent ejection;
- causing the first plurality of parts to be fabricated in the first level; and
- causing the second plurality of parts to be fabricated according to the determined modification of either or both of the orientation and the position of the second plurality of parts in the second level.

16. The method of claim 15, wherein determining the modification of either or both of the orientation and the position of the second plurality of parts comprises determining the second usage of the plurality of nozzles that results in the plurality of nozzles being used more uniformly with respect to each other to fabricate the first plurality of parts and the second plurality of parts as compared with usage of the plurality of nozzles to fabricate the first plurality of parts and the second plurality of parts without the modification of either or both of the orientation and the position of the second plurality of parts.

17. The method of claim 15, wherein the modification of either or both of the orientation and the position of the second plurality of parts comprises either or both of modification of some or all of the positions of the second plurality of parts within the second level and modification of the orientations of some or all of the second plurality of parts within the second level.

18. The method of claim 15, wherein the digital file identifies the first plurality of parts to be fabricated in the first level of the build volume in a first particular pattern and identifies the second plurality of parts to be fabricated in the second level of the build volume in a second particular pattern identical to the first particular pattern.

19. The method of claim 15, wherein determining the first usage of the plurality of nozzles comprises modeling usage of the plurality of nozzles in fabricating the first plurality of parts in the first level.

20. The method of claim 15, wherein determining the first usage of the plurality of nozzles comprises tracking usage of the plurality of nozzles during fabrication of the first plurality of parts.

\* \* \* \* \*